United States Patent
Pierfelice et al.

(10) Patent No.: US 10,008,199 B2
(45) Date of Patent: Jun. 26, 2018

(54) SPEECH RECOGNITION SYSTEM WITH ABBREVIATED TRAINING

(71) Applicant: Toyota Motor Engineering & Manufacturing North America, Inc., Erlanger, KY (US)

(72) Inventors: Jeffrey E. Pierfelice, Canton, MI (US); Sean L. Helm, Saline, MI (US); Bryan E. Yamasaki, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 14/833,059

(22) Filed: Aug. 22, 2015

(65) Prior Publication Data

US 2017/0053645 A1    Feb. 23, 2017

(51) Int. Cl.
| | | |
|---|---|---|
| *G10L 15/00* | (2013.01) | |
| *G10L 15/07* | (2013.01) | |
| *G10L 17/10* | (2013.01) | |
| *G10L 15/24* | (2013.01) | |
| *B60R 16/037* | (2006.01) | |

(52) U.S. Cl.
CPC .......... *G10L 15/07* (2013.01); *B60R 16/0373* (2013.01); *G10L 15/24* (2013.01); *G10L 17/10* (2013.01)

(58) Field of Classification Search
None
See application file for complete search history.

(56) References Cited

U.S. PATENT DOCUMENTS

| | | | |
|---|---|---|---|
| 5,540,589 A * | 7/1996 | Waters | G09B 5/04 434/118 |
| 5,553,119 A | 9/1996 | McAllister et al. | |
| 5,729,694 A * | 3/1998 | Holzrichter | G06Q 20/204 704/270 |
| 6,003,002 A * | 12/1999 | Netsch | G10L 15/20 704/236 |
| 6,442,519 B1 * | 8/2002 | Kanevsky | G10L 15/07 704/243 |
| 8,005,680 B2 | 8/2011 | Kommer | |
| 8,234,111 B2 * | 7/2012 | Lloyd | G10L 15/20 704/231 |
| 8,238,525 B2 | 8/2012 | Zhang et al. | |
| 2003/0191639 A1 | 10/2003 | Mazza | |
| 2012/0059579 A1 * | 3/2012 | Pierfelice | G01C 21/3608 701/427 |
| 2013/0030645 A1 * | 1/2013 | Divine | B60K 35/00 701/36 |
| 2014/0164559 A1 * | 6/2014 | Demeniuk | H04B 1/082 709/217 |

(Continued)

*Primary Examiner* — Marcus T Riley

(74) *Attorney, Agent, or Firm* — Christopher G. Darrow; Darrow Mustafa PC

(57) ABSTRACT

A method of adapting a speech recognition system to its user includes gathering information about a user of a speech recognition system, selecting at least a part of a speech model reflecting estimated speech attributes of the user based on the information about the user, running, in the speech recognition system, a speech model including the selected at least a part of a speech model, and training, in the speech recognition system, other parts of the speech model to reflect identified speech attributes of the user.

20 Claims, 3 Drawing Sheets

(56) References Cited

U.S. PATENT DOCUMENTS

| | | | | |
|---|---|---|---|---|
| 2014/0180697 A1* | 6/2014 | Torok | .................. | G06F 17/3074 |
| | | | | 704/275 |
| 2014/0236595 A1* | 8/2014 | Gray | .................... | G10L 15/187 |
| | | | | 704/235 |
| 2014/0309871 A1* | 10/2014 | Ricci | ........................ | B60Q 1/00 |
| | | | | 701/36 |
| 2014/0309872 A1* | 10/2014 | Ricci | .................... | H04W 48/04 |
| | | | | 701/36 |
| 2014/0309876 A1* | 10/2014 | Ricci | .................... | H04W 48/04 |
| | | | | 701/36 |
| 2014/0309878 A1* | 10/2014 | Ricci | .................... | H04W 48/04 |
| | | | | 701/36 |
| 2014/0309879 A1* | 10/2014 | Ricci | .................... | H04W 48/04 |
| | | | | 701/36 |
| 2017/0053645 A1* | 2/2017 | Pierfelice | ................ | G10L 15/07 |

* cited by examiner

SPEECH RECOGNITION SYSTEM WITH ABBREVIATED TRAINING

TECHNICAL FIELD

The embodiments disclosed herein generally relate to speech recognition systems.

BACKGROUND

Many vehicles have a voice actuated system whose operation is supported by a speech recognition system. The speech recognition system may include, among other things, a speech recognition engine and a speech model that the speech recognition engine relies on to perform speech recognition.

So-called speaker-dependent speech recognition systems adapt to their users, among other ways, by accounting for differences between the greater language speaking population's speech attributes and the user's speech attributes. For instance, while parts of the speech model can be selected to reflect identified speech attributes of the greater language speaking population, other parts of the speech model are trained to reflect identified speech attributes of the user. Typically, training requires the receipt of utterances from the user from which the user's speech attributes can be identified.

Training is often one of the user's first interactions with the voice actuated system. Although training benefits the user, some users may feel anxiety towards further interactions with the voice actuated system if, for instance, they find training confusing or tiresome.

SUMMARY

Disclosed herein are embodiments of methods involving adapting speech recognition systems to their users. In one aspect, a method of adapting a speech recognition system to its user includes gathering information about a user of a speech recognition system, selecting at least a part of a speech model reflecting estimated speech attributes of the user based on the information about the user, running, in the speech recognition system, a speech model including the selected at least a part of a speech model, and training, in the speech recognition system, other parts of the speech model to reflect identified speech attributes of the user.

In another aspect, a method of adapting systems of a vehicle includes gathering information about a user of a vehicle including a speech recognition system and at least one other system, selecting at least a part of a speech model reflecting estimated speech attributes of the user based on the information about the user, running, in the speech recognition system, a speech model including the selected at least a part of a speech model, training, in the speech recognition system, other parts of the speech model to reflect identified speech attributes of the user, and adapting the at least one other system based on the information about the user.

These and other aspects will be described in additional detail below.

BRIEF DESCRIPTION OF THE DRAWINGS

The various features, advantages and other uses of the present embodiments will become more apparent by referring to the following detailed description and drawings in which.

DETAILED DESCRIPTION

This disclosure teaches a speaker-dependent speech recognition system in which part(s) of a speech model that a speech recognition engine relies on to perform speech recognition are selected to reflect estimated speech attributes of a user. Training is abbreviated to the extent differences between the greater language speaking population's identified speech attributes and the user's speech attributes are accounted for this way instead of by training these parts of the speech model to reflect identified speech attributes of the user. Particularly for users prone to finding training confusing or tiresome, abbreviating training can reduce or eliminate resulting anxiety towards further interactions with the voice actuated system that these users otherwise might feel. The selection of these part(s) of the speech model may be based on information about the user. Where, for example, the speech recognition system is included in a vehicle, the information about the user can also be used to adapt other systems of the vehicle.

Figure 1:
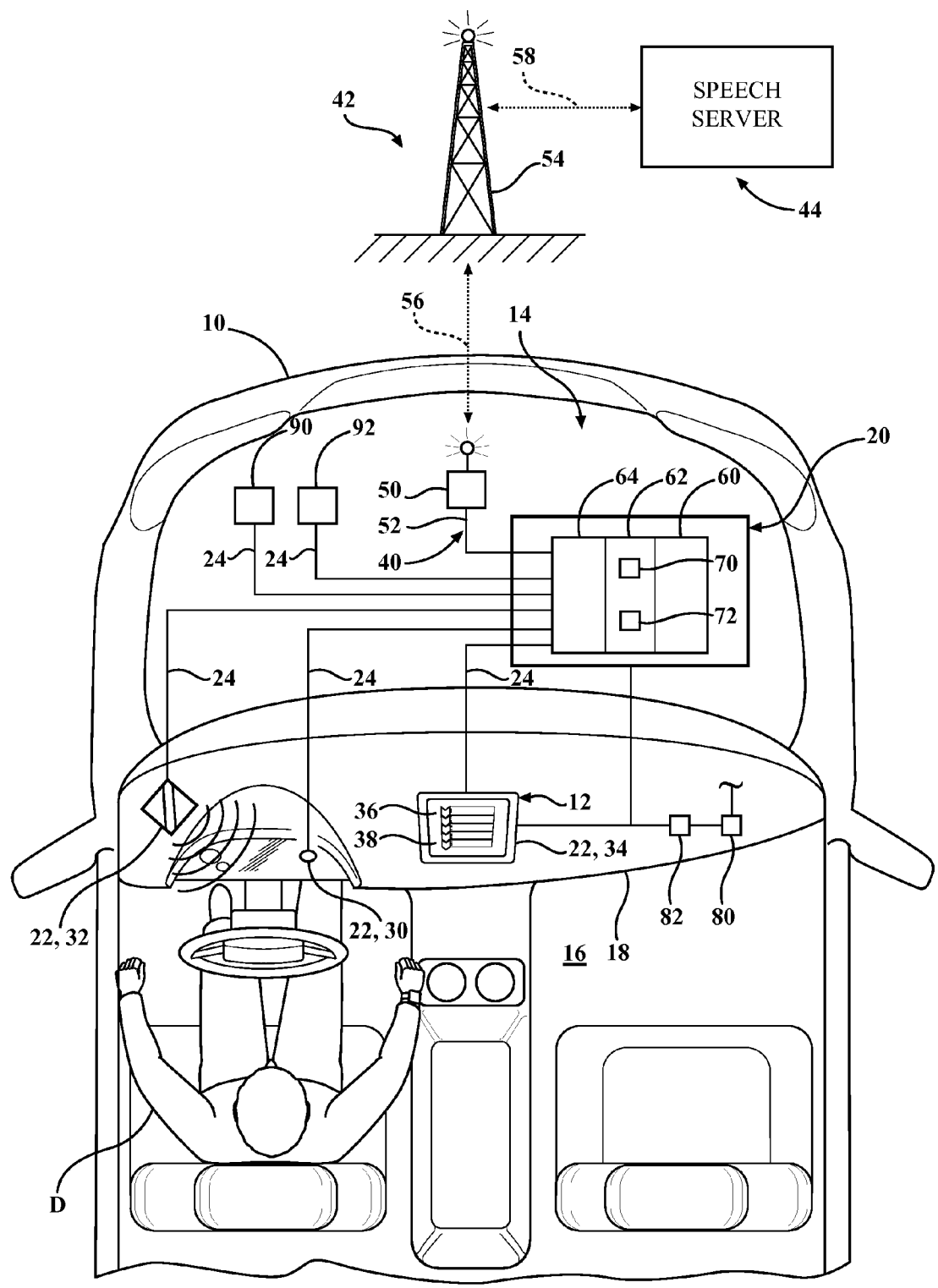
FIG. 1 is a schematic representation of a vehicle including a voice actuated in-vehicle infotainment (IVI) system whose operation is supported by a speaker-dependent speech recognition system including a speech recognition engine and a speech model.

FIG. 1 shows a vehicle 10 including a voice actuated in-vehicle infotainment (IVI) system 12 whose operation is supported by a speech recognition system 14. The vehicle 10 defines a passenger compartment 16 for accommodating one or more users with a transversely extending dash 18. As used herein, the term "user" refers generally to a driver D operating the vehicle 10 or any other person present within the passenger compartment 16. The vehicle 10 and the voice actuated IVI system 12 are provided as non-limiting examples to facilitate the discussion of the speech recognition system 14. Accordingly, it will be understood that the speech recognition system 14 could support other voice actuated systems, whether or not they are included in the vehicle 10.

Generally speaking, the speech recognition system 14 may receive verbal input, or utterances, that include commands from a user, and identify speech in those utterances. The speech recognition system 14 may then, either alone or in collaboration with the voice actuated IVI system 12, recognize the commands from the identified speech and instruct the voice actuated IVI system 12 to perform a particular task according to the recognized commands.

The vehicle 10 includes a computing device 20. To support its operation, the vehicle 10 may further include a number of components operably interconnected with the computing device 20. For example, the vehicle 10 may include input/output hardware 22 communicatively connected to the computing device 20 through one or more communication links 24. Although the computing device 20 and one, some or all of the individual components of the input/output hardware 22 may be dedicated to the speech recognition system 14, it is contemplated that some or all of these could also support the operation of other systems of the vehicle 10, such as the voice actuated IVI system 12, for example.

The input/output hardware 22 serves as an interface between a user and the systems of the vehicle 10, such as the speech recognition system 14. The input/output hardware 22 may be, or include, any device or devices capable of transforming mechanical and/or verbal inputs received from a user into electrical signals capable of transmission via the communication links 24, or transforming electrical signals, for example electrical signals received from the computing device 20, into tactile, visual and/or sound outputs that may be sensed by a user. Each individual component of the input/output hardware 22 may include one or more processors and one or more memories. Alternatively, each individual component of the input/output hardware 22 may be configured without a processor and/or a memory. In some implementations, multiple individual input/output hardware 22 components may be integrated into a single unit.

The input/output hardware 22 may include, for example, a microphone 30 for receiving verbal inputs from a user and transforming those verbal inputs into electrical signals capable of transmission via the communication links 24 to the computing device 20, and a speaker 32 for receiving electrical signals from the computing device 20 via a communication link 24 and transforming those electrical signals into sound outputs that can be heard by a user. The microphone 30 may be located within the passenger compartment 16 of the vehicle 10 at any location suitable for receiving verbal inputs from a user, such as at the dash 18. Similarly, the speaker 32 may be located within the passenger compartment 16 of the vehicle 10 at any location suitable for its sound outputs to be heard by a user, such as at the dash 18.

The input/output hardware 22 may further include a display 34. The display 34 may, as shown, be included in the voice actuated IVI system 12. The display 34 may receive electrical signals from the computing device 20 via a communication link 24 and employ any of various display technologies capable of transforming those electrical signals into visual outputs at a surface 36 of the display 34. The display 34 may also include a touch screen 38 capable of detecting the presence and location of mechanical inputs received from a user at the surface 36 of the display 34 and transforming those mechanical inputs into electrical signals capable of transmission via the communication links 24 to the computing device 20. The display 34 may be configured, for example, to receive these mechanical inputs via the touch screen 38 directly upon the visual outputs at the surface 36 of the display 34. The display 34, similarly to the microphone 30 and the speaker 32, may be located within the passenger compartment 16 of the vehicle 10 at the dash 18 or at any other location suitable for its visual outputs to be seen by a user and for receiving mechanical inputs from a user via the touch screen 38.

To further support the operation of the computing device 20, the vehicle 10 may also include an integrated mobile communication system 40 with variously configured communication hardware for wirelessly transmitting data between the computing device 20 and a mobile network 42, such as a cellular network. The mobile communication system 40 and the mobile network 42 together enable the computing device 20 to wirelessly communicate with other devices connected to the mobile network 42, such as a speech server 44 that may similarly be, or include, a computing device including one or more processors and one or more memories.

The mobile communication system 40 of the vehicle 10 may include an integrated mobile network transceiver 50 configured to transmit and receive data over the mobile network 42. The mobile network transceiver 50 may be communicatively connected to the computing device 20 though a mobile network transceiver communication link 52. The mobile network transceiver 50 includes a transmitter for wirelessly transferring data from the computing device 20 to the mobile network 42 and a receiver for wirelessly transferring data from the mobile network 42 to the computing device 20.

The mobile network 42 may, for example, be served by at least one fixed-location transceiver or base station 54 that may be used to establish a wireless mobile communication link 56 communicatively connecting the mobile network transceiver 50 and the mobile network 42, and a wireless mobile communication link 58 communicatively connecting the mobile network 42 and the speech server 44.

The computing device 20 may include a processor 60 communicatively coupled with a memory 62. The processor 60 may include any device capable of executing machine-readable instructions, which may be stored on a non-transitory computer-readable medium, for example the memory 62. The processor 60 may include a controller, an integrated circuit, a microchip, a computer, and/or any other computing device. The memory 62 may include any type of computer readable medium suitable for storing data and algorithms. For example, the memory 62 may include RAM, ROM, a flash memory, a hard drive, and/or any device capable of storing machine-readable instructions.

The computing device 20 may also include an input/output interface 64 for facilitating communication between the processor 60, the input/output hardware 22 and the mobile network transceiver 50. Although the computing device 20 is schematically illustrated as including a single processor 60 and a single memory 62, in practice the computing device 20 may include a plurality of components, each having one or more memories 62 and/or processors 60 that may be communicatively coupled with one or more of the other components. The computing device 20 may be a separate standalone unit or may be configured as a part of a central control system for the vehicle 10.

The various algorithms and data for the speech recognition system 14 and the other systems of the vehicle 10, such as the voice actuated IVI system 12, for example, may reside in whole or in part in the memory 62 of the computing device 20. For the speech recognition system 14, these may include a speech recognition engine 70 capable of performing speech recognition, that is, recognizing speech from among a user's verbal input, or utterances, and a speech model 72 that the speech recognition engine 70 relies on to perform speech recognition. Although the speech recognition engine 70 and the speech model 72 for the speech recognition system 14 are described below with reference to the computing device 20 of the vehicle 10 for simplicity, it will be understood that these and others of the various algorithms and data for the speech recognition system 14 may reside in whole or in part in a memory of a computing device separate from the vehicle 10, such as in a memory in the speech server 44, for instance.

As a whole, the speech model 72 for the speech recognition system 14 is specific to a given language, such as English. Generally speaking, the greater language speaking population to which a user belongs has identified speech attributes, which the speech model 72, among other things in the speech recognition system 14, largely reflects. Typically, a user, as a result of any one or any combination of their accent, pitch, cadence, tone, tempo, intonation, inflection, co-articulation and stress, for instance, has speech attributes that are different from those identified for the greater language speaking population. The speech recognition system 14 is speaker-dependent, meaning that it is adaptable to a user to account for these differences.

Figure 2:
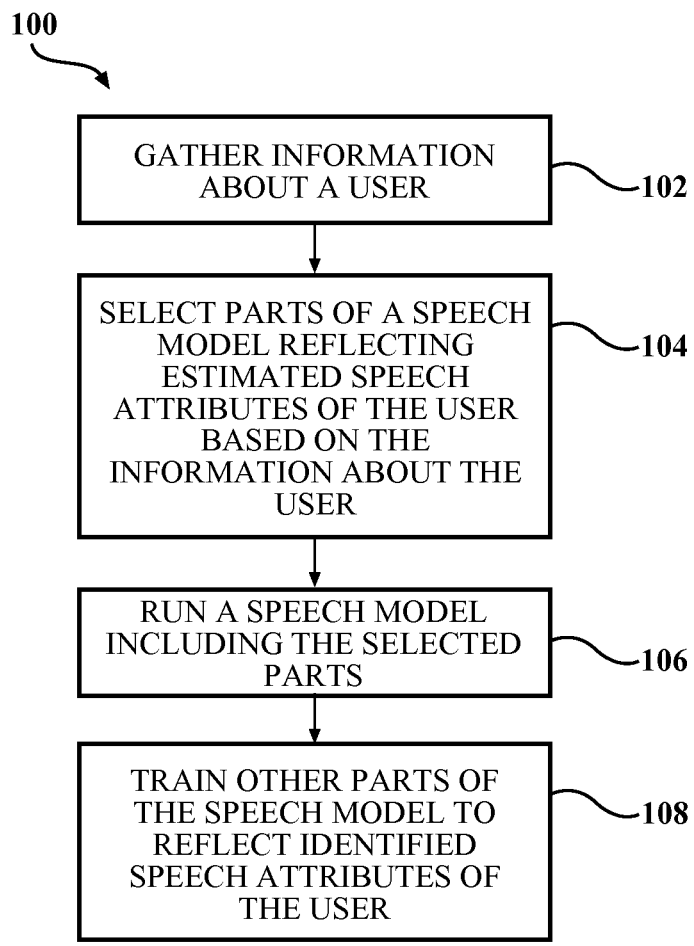
FIG. 2 is a flow diagram depicting the operations of a process for adapting the speech recognition system in part by selecting part(s) of the speech model to reflect estimated speech attributes of a user based on information about the user.

The operations of a process 100 for adapting the speech recognition system 14 in part by selecting part(s) of the speech model 72 reflecting estimated speech attributes of a user of the vehicle 10 are shown in FIG. 2.

In operation 102, information about a user of the vehicle 10 is gathered and communicated to the computing device 20 via the input/output interface 64. The information about the user may be, in whole or in part, indicative of the user's speech attributes. The information about the user may be, or include, the location where the user acquired the vehicle 10, for example, under the assumption that the location where the user acquired the vehicle 10 corresponds to the location where the user resides. Alternatively, or additionally, the information about the user may be, or include, any combination of the user's accent, age, ethnicity and gender, for example.

In some implementations of operation 102, the information about the user may be gathered via the input/output hardware 22 and communicated to the computing device 20 via the input/output interface 64. In these implementations, the information about the user may, for example, be gathered through the receipt of mechanical inputs by the user detected by the touch screen 38 at the surface 36 of the display 34 of the voice actuated IVI system 12.

In other implementations of operation 102, the information about the user may be gathered remotely, transferred as data over the mobile network 42 for receipt by the mobile network transceiver 50 and communicated to the computing device 20 via the input/output interface 64 and/or by the speech server 44. In these implementations, the information about the user ultimately received by the mobile network transceiver 50 and communicated to the computing device 20 and/or by the speech server 44 may, for example, be gathered from among information documenting the user's acquisition of the vehicle 10 residing, for instance, in a memory of a dealer's computing device including one or more processors and one or more memories.

Where the information about the user includes the location where the user acquired the vehicle 10, this location may be identified, for instance, as the physical location of the vehicle 10 determined using a GPS or other positioning system upon the initial startup of the speech recognition system 14. As shown in FIG. 1, the vehicle 10 includes a power source 80. While certain primary systems of the vehicle 10, such as its ignition system, engine system, braking system and lighting system, may be electrically connected to the power source 80 from the factory, other auxiliary systems of the vehicle 10, such as the voice actuated IVI system 12 and the speech recognition system 14, may be electrically disconnected from the power source 80 from the factory, with the vehicle 10 including a device 82, such as a fuse holder, between these auxiliary systems of the vehicle 10 and the power source 80 that may be selectively actuated to electrically connect them to the power source 80. In the case of the device 82 being a fuse holder, the device 82 may be selectively actuated by the installation of a fuse in the device 82.

With this configuration of the vehicle 10, the power source 80 can be preserved while maintaining the basic functionality of the vehicle 10 during transit of the vehicle 10 from the factory to the point of acquisition by the user where the device 82 may be actuated to enable the full functionality of the vehicle 10 for the user by enabling operation of the auxiliary systems of the vehicle 10, such as the voice actuated IVI system 12 and the speech recognition system 14. Under the assumption that this protocol is followed for the vehicle 10, the location where the user acquired the vehicle 10 may be identified as the physical location of the vehicle 10 determined using a GPS or other positioning system upon the initial startup of the speech recognition system 14.

In operation 104, based on the information about the user of the vehicle 10, at least a part (i.e., part(s)) of the speech model 72 for the speech recognition system 14 are selected that reflect the user's estimated speech attributes, and in operation 106, the selected part(s) of the speech model 72 that reflect the user's estimated speech attributes are run in the speech recognition system 14 with the remainder of the speech model 72.

In some implementations, the selection of part(s) of the speech model 72 that reflect the user's estimated speech attributes according to operation 104 may be performed at the computing device 20. In these implementations, the ultimately selected part(s) of the speech model 72 that reflect the user's estimated speech attributes may reside in the memory 62 of the computing device 20 among a plurality of different at least parts of speech models that respectively reflect different speech attributes. In operation 104, upon the communication of the information about the user to the computing device 20 according to operation 102, the computing device 20 uses the information about the user to select the part(s) of the speech model 72 that reflect the user's estimated speech attributes from among the plurality of different at least parts of speech models that respectively reflect different speech attributes for running, according to operation 106, in the speech recognition system 14 with the remainder of the speech model 72.

In other implementations, the selection of part(s) of the speech model 72 that reflect the user's estimated speech attributes according to operation 104 may be performed at the speech server 44. In these implementations, the ultimately selected part(s) of the speech model 72 that reflect the user's estimated speech attributes may reside in a memory of the speech server 44 among a plurality of different at least parts of speech models that respectively reflect different speech attributes. In operation 104, upon the communication of the information about the user to the computing device 20 or the speech server 44 according to operation 102, the computing device 20 or the speech server 44, as the case may be, uses the information about the user to select the part(s) of the speech model 72 that reflect the user's estimated speech attributes from among the plurality of different at least parts of speech models that respectively reflect different speech attributes. The selected part(s) of the speech model 72 that reflect the user's estimated speech attributes may then be transferred as data over the mobile network 42 for receipt by the mobile network transceiver 50 and communicated to the computing device 20 via the input/output interface 64 for running, according to operation 106, in the speech recognition system 14 with the remainder of the speech model 72.

In some implementations, the process 100 may be performed in conjunction with the residence of a baseline speech model 72 for the speech recognition system 14 whose parts reflect the greater language speaking population's identified speech attributes, as well as a plurality of different parts of speech models that respectively reflect different speech attributes. In these implementations, according to operation 104, the part(s) of the speech model 72 that reflect the user's estimated speech attributes are selected from among the plurality of different parts of speech models that respectively reflect different speech attributes and are added to the baseline speech model 72 to create the speech model 72 ultimately ran in the speech recognition system 14 according to operation 106.

In other implementations, the process 100 may be performed in conjunction with the residence of a plurality of different speech models 72 that largely share parts that reflect the greater language speaking population's identified speech attributes, but that are differentiated from one another by different parts of speech models that respectively reflect different speech attributes. In these implementations, according to operation 104, a speech model 72 that includes the part(s) of the speech model 72 that reflect the user's estimated speech attributes is selected from among the plurality of different speech models 72 for running in the speech recognition system 14 according to operation 106.

Upon running the speech model 72 in the speech recognition system 14 according to operation 106, in operation 108, other parts of the speech model 72 beyond the selected part(s) of the speech model 72 that reflect the user's estimated speech attributes are trained in the speech recognition system 14 to reflect the user's identified speech attributes.

In relation to training the speech model 72 in operation 108, the speech recognition system 14 receives an utterance from the user. The utterance from the user may, for example, be gathered via the input/output hardware 22 and communicated to the computing device 20 via the input/output interface 64. The utterance from the user may, for example, be gathered through receipt by the microphone 30. As opposed to the user's estimated speech attributes reflected in the part(s) of the speech model 72 discussed above, the utterance from the user is used in relation to training the speech model 72 in operation 108 to identify the user's speech attributes and train the other parts of the speech model 72 to reflect the user's identified speech attributes.

In the foregoing description of the process 100, the part(s) or parts of the speech model 72, as the case may be, may be part(s) or parts of a dictionary of the speech model 72 that includes, for example, words and one or more pronunciations associated to each of the words. Where the user's speech attributes, among other things, result in differences between the user's pronunciation of certain words and the greater language speaking population's pronunciation of those words, the selected part(s) of the speech model 72 that reflect the user's estimated speech attributes may be, for example, pronunciation(s) associated to word(s) in the dictionary of the speech model 72 that reflect the user's estimated pronunciation(s) of the word(s). Similarly, the parts of the speech model 72 trained to reflect the user's identified speech attributes may be, for example, pronunciations associated to words in the dictionary of the speech model 72 that reflect the user's identified pronunciations of the words.

Advantageously, according to the process 100, training the speech model 72 in operation 108 is abbreviated to the extent differences between the greater language speaking population's identified speech attributes and the user's speech attributes are accounted for according to operations 100-104 by the selection of part(s) of the speech model 72 that reflect the user's estimated speech attributes instead of by training these ultimately selected part(s) of the speech model 72 to reflect the user's identified speech attributes according to operation 108. Particularly for users prone to finding the training of the speech model 72 in operation 108 confusing or tiresome, abbreviating this training in operation 108 can reduce or eliminate resulting anxiety towards further interactions with the voice actuated IVI system 12 or other voice actuated systems of the vehicle 10 that these users otherwise might feel.

Some or all of the information about the user of the vehicle 10 used in the process 100 for adapting the speech recognition system 14 can also be used to adapt other systems of the vehicle, such as the voice actuated IVI system 12 and, as shown in FIG. 1, an engine system 90 for the vehicle 10 or a suspension system 92 for the vehicle 10, which are communicatively connected to the computing device 20 through one or more communication links 24. Similar to those for the voice actuated IVI system 12, the various algorithms and data for the engine system 90 and the suspension system 92 may reside in whole or in part in the memory 62 of the computing device 20.

Figure 3:
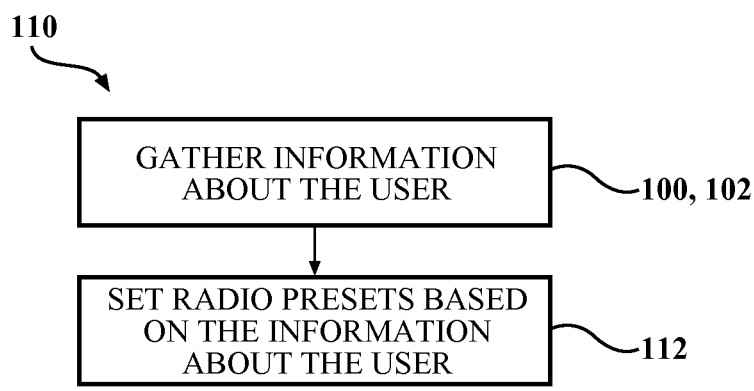
FIGS. 3-5 are flow diagrams depicting the operations of processes for adapting other systems of the vehicle based on the information about the user.

The operations of a process 110 for adapting the voice actuated IVI system 12 of the vehicle 10 based on the information about the user of the vehicle 10 are shown in FIG. 3. Initially, information about the user is gathered and communicated to the computing device 20 via the input/output interface 64 according to operation 102 of the process 100. In operation 112, in cases where the voice actuated IVI system 12 includes radio presets settable to different radio stations, one or more of the radio presets may be set based on the information about the user. In implementations where the information about the user is, or includes, the location where the user acquired the vehicle 10, one or more of the radio presets may be set to radio stations local to the location where the user acquired the vehicle 10, for instance. In implementations where the information about the user further includes any combination of the user's age, ethnicity and gender, for example, the user's radio preferences may be estimated based on these aspects of the information about the user, and the one or more of the radio presets may additionally be set based on the user's estimated radio preferences.

Figure 4:
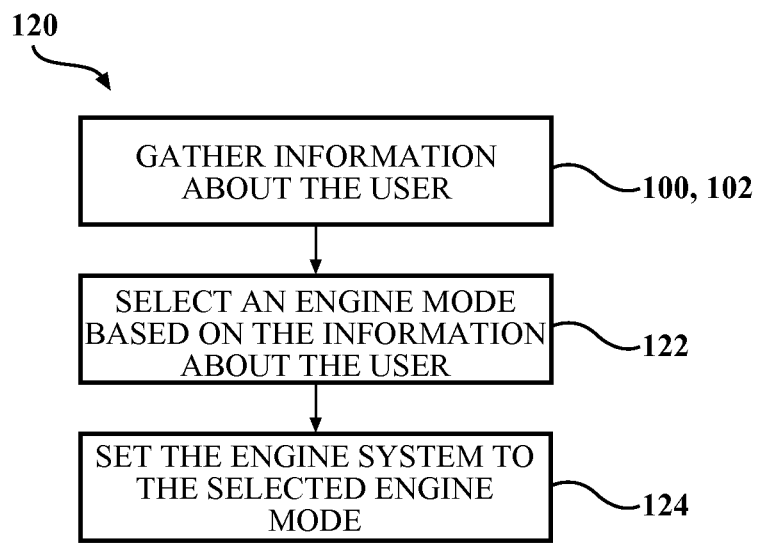

The operations of a process 120 for adapting the engine system 90 of the vehicle 10 based on the information about the user of the vehicle 10 are shown in FIG. 4. Initially, information about the user is gathered and communicated to the computing device 20 via the input/output interface 64 according to operation 102 of the process 100. In operation 122, in cases where the engine system 90 includes a plurality of engine modes, one or more of the engine modes may be selected based on the information about the user. In implementations where the information about the user is, or includes, the location where the user acquired the vehicle 10, the engine mode best suited to the location where the user acquired the vehicle 10 may be selected, for instance. In implementations where the information about the user further includes any combination of the user's age, ethnicity and gender, for example, the user's engine performance preferences may be estimated based on these aspects of the information about the user, and the engine mode may additionally be selected based on the user's estimated engine performance preferences. In operation 124, the engine system 90 is set to the selected engine mode.

Figure 5:
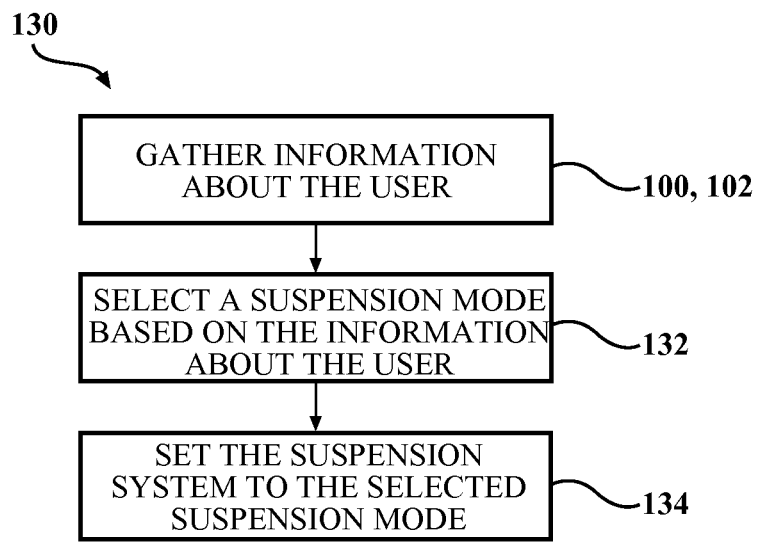

The operations of a process 130 for adapting the suspension system 92 of the vehicle 10 based on the information about the user of the vehicle 10 are shown in FIG. 5. Initially, information about the user is gathered and communicated to the computing device 20 via the input/output interface 64 according to operation 102 of the process 100. In operation 132, in cases where the suspension system 92 includes a plurality of suspension modes, one or more of the suspension modes may be selected based on the information about the user. In implementations where the information about the user is, or includes, the location where the user acquired the vehicle 10, the suspension mode best suited to the location where the user acquired the vehicle 10 may be selected, for instance. In implementations where the information about the user further includes any combination of the user's age, ethnicity and gender, for example, the user's suspension performance preferences may be estimated based on these aspects of the information about the user, and the suspension mode may additionally be selected based on the user's estimated suspension performance preferences. In operation 134, the suspension system 92 is set to the selected suspension mode.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of adapting a speech recognition system to its user, comprising:
   gathering information about a user of a speech recognition system; and
   generating a speech model on which the speech recognition system is configured to rely in order to identify speech in utterances of the user, the generating including:
      selecting, based on the information about the user, at least a part of a speech model reflecting non-utterance-based estimated speech attributes of the user that differ from those of a greater language speaking population;
      running, in the speech recognition system, a speech model including the selected at least a part of a speech model, whereby the speech recognition system relies on the speech model in order to identify speech in the user's utterances; and
      training, in the speech recognition system, other parts of the speech model, whereby the other parts of the speech model reflect utterance-based identified speech attributes of the user that differ from those of the greater language speaking population; whereby the generated speech model includes the selected at least a part of a speech model and the trained other parts of the speech model.

2. The method of claim 1, wherein the information about the user includes any combination of the user's accent, age, ethnicity and gender.

3. The method of claim 1, further comprising:
   creating a speech model including the selected at least a part of a speech model, wherein the running comprises running, in the speech recognition system, the created speech model, whereby the speech recognition system relies on the created speech model in order to identify speech in the user's utterances.

4. The method of claim 1, wherein the selecting and running comprise:
   selecting, based on the information about the user, a speech model reflecting the user's non-utterance-based estimated speech attributes from a plurality of different speech models respectively reflecting different speech attributes that differ from those of the greater language speaking population; and
   running, in the speech recognition system, the selected speech model, whereby the speech recognition system relies on the selected speech model in order to identify speech in the user's utterances.

5. The method of claim 1, wherein the gathering and selecting comprise:
   receiving, at the speech recognition system, the information about the user; and
   selecting, based on the information about the user, with the speech recognition system, the at least a part of a speech model from a plurality of different at least parts of speech models included in the speech recognition system and respectively reflecting different speech attributes that differ from those of the greater language speaking population.

6. The method of claim 1, wherein the gathering and selecting comprise:
   receiving the information about the user;
   selecting, based on the information about the user, the at least a part of a speech model from a plurality of different at least parts of speech models included in a speech server remote from the speech recognition system and respectively reflecting different speech attributes that differ from those of the greater language speaking population; and
   transferring, to the speech recognition system from the speech server, the selected at least a part of a speech model.

7. The method of claim 1, further comprising:
   receiving, at the speech recognition system, an utterance from the user; and
   identifying, with the speech recognition system, the user's utterance-based speech attributes based on the received utterance.

8. A method of adapting systems of a vehicle, comprising:
   gathering information about a user of a vehicle including a speech recognition system and at least one other system;
   generating a speech model on which the speech recognition system is configured to rely in order to identify speech in utterances of the user, the generating including:
      selecting, based on the information about the user, at least a part of a speech model reflecting non-utterance-based estimated speech attributes of the user that differ from those of a greater language speaking population;
      running, in the speech recognition system, a speech model including the selected at least a part of a speech model, whereby the speech recognition system relies on the speech model in order to identify speech in the user's utterances; and
      training, in the speech recognition system, other parts of the speech model, whereby the other parts of the speech model reflect utterance-based identified speech attributes of the user that differ from those of the greater language speaking population; whereby the generated speech model includes the selected at least a part of a speech model and the trained other parts of the speech model; and
   adapting, based on the information about the user, the at least one other system.

9. The method of claim 8, wherein the information about the user includes any combination of the user's accent, age, ethnicity and gender.

10. The method of claim 8, wherein the information about the user includes a location where the user acquired the vehicle, and the gathering comprises:
   determining the vehicle's location upon the speech recognition system's initial startup; and
   identifying the determined location as the location where the user acquired the vehicle.

11. The method of claim 8, wherein the vehicle includes input hardware, and the gathering comprises:
   receiving the information about the user at the input hardware.

12. The method of claim 8, wherein the gathering comprises:
   receiving the information about the user from among information documenting the user's acquisition of the vehicle.

13. The method of claim 8, further comprising:
   creating a speech model including the selected at least a part of a speech model, wherein the running comprises running, in the speech recognition system, the created speech model, whereby the speech recognition system relies on the created speech model in order to identify speech in the user's utterances.

14. The method of claim 8, wherein the selecting and running comprise:
   selecting, based on the information about the user, a speech model reflecting the user's non-utterance-based estimated speech attributes from a plurality of different speech models respectively reflecting different speech attributes that differ from those of the greater language speaking population; and
   running, in the speech recognition system, the selected speech model, whereby the speech recognition system relies on the selected speech model in order to identify speech in the user's utterances.

15. The method of claim 8, wherein the gathering and selecting comprise:
   receiving, at the speech recognition system, the information about the user; and
   selecting, based on the information about the user, with the speech recognition system, the at least a part of a speech model from a plurality of different at least parts of speech models included in the speech recognition system and respectively reflecting different speech attributes that differ from those of the greater language speaking population.

16. The method of claim 8, wherein the gathering and selecting comprise:
   receiving the information about the user;
   selecting, based on the information about the user, the at least a part of a speech model from a plurality of different at least parts of speech models included in a speech server remote from the speech recognition system and respectively reflecting different speech attributes that differ from those of the greater language speaking population; and
   transferring, to the speech recognition system from the speech server, the selected at least a part of a speech model.

17. The method of claim 8, further comprising:
   receiving, at the speech recognition system, an utterance from the user; and
   identifying, with the speech recognition system, the user's utterance-based speech attributes based on the received utterance.

18. The method of claim 8, wherein the at least one other system is an IVI system supported by the speech recognition system that has radio presets settable to different radio stations, the information about the user includes a location where the user acquired the vehicle, and the adapting comprises:
   setting one or more of the radio presets to radio stations local to the location where the user acquired the vehicle.

19. The method of claim 8, wherein the at least one other system is an engine system that has a plurality of engine modes, the information about the user includes a location where the user acquired the vehicle, and the adapting comprises:
   selecting an engine mode from the plurality of engine modes based on the location where the user acquired the vehicle; and
   setting the engine system to the selected engine mode.

20. The method of claim 8, wherein the at least one other system is a suspension system that has a plurality of suspension modes, and the adapting comprises:
   selecting a suspension mode from the plurality of suspension modes based on the information about the user; and
   setting the suspension system to the selected suspension mode.

* * * * *